US010286888B2

(12) United States Patent
Calvo Martinez et al.

(10) Patent No.: US 10,286,888 B2
(45) Date of Patent: May 14, 2019

(54) VACUUM BRAKE BOOSTER HAVING A THROTTLE CONTROL VALVE ASSEMBLY

(71) Applicant: Lucas Automotive GmbH, Koblenz (DE)

(72) Inventors: José Manuel Calvo Martinez, Kruft (DE); Paul Warkentin, Neuwied (DE); Kurt Wingender, Hartenfels (DE); Martin Hofmann, Mendig (DE)

(73) Assignee: Lucas Automotive GmbH, Koblenz (DE)

( * ) Notice: Subject to any disclaimer, the term of this patent is extended or adjusted under 35 U.S.C. 154(b) by 137 days.

(21) Appl. No.: 15/551,050

(22) PCT Filed: Jan. 13, 2016

(86) PCT No.: PCT/EP2016/050492
§ 371 (c)(1),
(2) Date: Aug. 15, 2017

(87) PCT Pub. No.: WO2016/131563
PCT Pub. Date: Aug. 25, 2016

(65) Prior Publication Data
US 2018/0029580 A1    Feb. 1, 2018

(30) Foreign Application Priority Data
Feb. 16, 2015    (DE) ........................ 10 2015 001 981

(51) Int. Cl.
*B60T 13/57*    (2006.01)
*B60T 13/56*    (2006.01)
(Continued)

(52) U.S. Cl.
CPC .............. *B60T 13/57* (2013.01); *B60T 13/56* (2013.01); *B60T 13/569* (2013.01); *B60T 15/10* (2013.01)

(58) Field of Classification Search
CPC ................................ B60T 13/57; B60T 15/10
See application file for complete search history.

(56) References Cited

U.S. PATENT DOCUMENTS

| 6,477,935 | B1 | 11/2002 | Schonlau et al. |
| 7,234,384 | B2 * | 6/2007 | Maligne ................ B60T 13/569 91/369.2 |
| 8,210,091 | B2 | 7/2012 | Anderson et al. |

FOREIGN PATENT DOCUMENTS

| DE | 3935811 A1 | 5/1991 |
| EP | 1323606 A1 | 7/2003 |

(Continued)

OTHER PUBLICATIONS

PCT Search Report and the Written Opinion, Application No. PCT/EP2016/050492 filed Jan. 13, 2016, dated Apr. 13, 2016.

Primary Examiner — F Daniel Lopez
(74) Attorney, Agent, or Firm — MacMillan, Sobanski & Todd, LLC

(57) ABSTRACT

A vacuum brake booster for a motor vehicle brake system, comprising a displaceable force input member that is coupled to or can be coupled to a brake pedal, a chamber arrangement arranged in a booster housing having at least one working chamber and at least one vacuum chamber, which are separated from one another via at least one movable wall, a control valve assembly that can be actuated by the force input member, and a force output member for transmitting an operating force to a downstream brake system. The at least one working chamber can be fluidically connected optionally to a negative pressure source or the atmosphere by way of the control valve assembly. The control valve assembly comprises a control valve housing, in which an actuating piston that is coupled with the force input member s displaceably arranged, and a first valve seat, and a second valve seat. Upon an actuation of the force input (Continued)

member, a throttle sleeve can be displaced from the initial position relative to the control valve housing by a predetermined functional path. During the displacement, the throttle sleeve is in abutment with the actuating piston such that a fluidic connection between the at least one working chamber and the ambient atmosphere by way of a throttle window is present. Upon exceeding the functional path, the throttle sleeve lifts off the actuating piston.

15 Claims, 3 Drawing Sheets

(51) Int. Cl.
 *B60T 13/569* (2006.01)
 *B60T 15/10* (2006.01)

(56) References Cited

FOREIGN PATENT DOCUMENTS

| EP | 1323606 B1 | 6/2005 |
|---|---|---|
| EP | 1304273 B1 | 11/2006 |
| EP | 2085277 A1 | 8/2009 |
| WO | 00/18627 A1 | 4/2000 |
| WO | 2004/065191 A1 | 8/2004 |

* cited by examiner

VACUUM BRAKE BOOSTER HAVING A THROTTLE CONTROL VALVE ASSEMBLY

CROSS-REFERENCE TO RELATED APPLICATIONS

This application is a national stage of International Application No. PCT/EP2016/050492, filed 13 Jan. 2016, the disclosures of which are incorporated herein by reference in entirety, and which claimed priority to German Patent Application No. 10 2015 001 981.3, filed 16 Feb. 2015, the disclosures of which are incorporated herein by reference in entirety.

BACKGROUND OF THE INVENTION

The present invention relates to a vacuum brake booster for a motor vehicle brake system, comprising a displaceable force input member which is coupled or is capable of being coupled with a brake pedal, a chamber arrangement being arranged in a booster housing, having at least one working chamber and at least one vacuum chamber which are separated from one another via at least one movable wall, a control valve assembly which is actuatable by the force input member, and a force output member for transferring an actuating force to a downstream brake system, wherein the at least one working chamber is optionally fluidically connectable to a vacuum power source or the atmosphere via the control valve assembly, and wherein the control valve assembly is connected to the at least one movable wall for joint movement, wherein the control valve assembly comprises: a control valve housing in which an actuating piston is arranged displaceably, the actuating piston being coupled to the force input member, and a first valve seat and a second valve seat, wherein the control valve assembly is biased into a normal position in which at least the first valve seat is closed.

Such vacuum brake boosters are well known from the prior art. By fluidically connecting the at least one working chamber either to a vacuum power source, for example the intake manifold of a combustion engine, or to the surrounding atmosphere by means of the control valve assembly, a pressure difference can be built up at the at least one movable wall as required. This pressure difference can boost the brake force exerted on the brake pedal by the driver and thus assist with the braking process. In particular, the fluidical connection between the at least one working chamber and the surrounding atmosphere can be established by opening a valve seat, which is here referred to as the first valve seat. Correspondingly, the at least one working chamber can be connected to the vacuum power source or separated from the vacuum power source via the valve seat referred to as the second valve seat.

It has been shown that, when the first valve seat is opened, instabilities in the air stream that develops frequently occur in the air gap that forms. These instabilities can manifest themselves as vibrations at the brake pedal that are noticeable to the driver and/or as noise in the footwell of the vehicle. The mentioned instabilities can develop not only at the start of braking but also when braking is increased in its intensity from a holding phase. In other words, these instabilities occur whenever the control valve assembly is displaced from an equilibrium position, which is generally referred to here as the normal position and in which the first valve seat and the second valve seat are closed, in order to open the first valve seat.

Since the described instabilities occur predominantly at high flow rates in the region of the control valve assembly, attempts are made in the prior art to restrict the supply of air from the region of the surrounding atmosphere in the affected portion of the control valve assembly or of the brake booster.

Such a vacuum brake booster is known, for example, from document WO 00/18627 A1. This document describes a vacuum brake booster having a control valve assembly which comprises a flexible air filter. The air filter is arranged in or on a displaceable actuating piston of the control valve assembly. In conjunction with a baffle plate and an associated valve seat it forms a changeable inflow cross-section for ambient air flowing through the valve assembly. The baffle plate has a protruding stop edge which plunges into the flexible air filter to a predetermined degree when the valve seat is closed. If the valve seat is opened by displacement of the actuating piston and the air filter thus moves away from the baffle plate, or the stop edge thereof, the degree by which the stop edge plunges into the air filter is reduced. As long as the stop edge of the baffle plate and the air filter act together, that is to say as long as the stop edge is not lifted from the air filter completely, the ambient air flowing in from outside is conducted by the baffle plate through the filter and is thereby restricted. Owing to the arrangement of the baffle plate, the air filter and the valve seat, the inflowing air is guided substantially in an S-shape through the air filter.

Further prior art is known from document EP 1 323 606 B1. This document describes a vacuum brake booster having a control valve assembly which comprises a resilient flow control valve for the known valve seats. The flow control valve is preferably made of a rubber-elastic material and has a radial opening. The flow control valve is connected in an interlocking manner to a valve element and is fixed relative thereto in its position relative to the valve element. The flow control valve is sectionally in contact with a displaceable actuating piston of the control valve assembly. If the actuating piston is moved away from the flow control valve in the actuating direction, the first valve seat opens in order to connect a working chamber with the surrounding atmosphere. Since the flow control valve is resiliently deformed for sectional contact with the actuating piston, the flow control valve initially remains in contact with the actuating piston when the above-mentioned first valve seat is opened. Ambient air thereby initially flows via the opening of the flow control valve through the open first valve seat into the working chamber. During this process, the flow control valve is not displaced relative to a housing of the control valve assembly and relative to the valve element.

The solutions from the prior art use components which, because of their material properties, are susceptible to contamination and/or wear. As the operating time increases, this has negative effects on the functioning of the brake booster in question. For example, an air filter can become at least partially blocked by impurities in the ambient air and restrict the flowing air stream too greatly. The material that is used for the air filter can also become porous as the operating time increases. The result in both cases is that the intended function of the control valve assembly can no longer be ensured sufficiently. The same is true for a rubber-elastic flow restricting valve whose resilient material properties become worse over time. This can lead to a loss of the resilient preloading of the flow restricting valve relative to the actuating piston, which likewise has a negative effect on the functioning of the control valve assembly, or on the flow restricting behavior.

BRIEF SUMMARY OF THE INVENTION

Accordingly, it is a feature of the present invention to provide a vacuum brake booster of the type mentioned at the beginning which reduces the mentioned instabilities and in which the number of components used that are susceptible to wear is reduced.

As mentioned at the beginning, according to the invention the at least one working chamber can be connected to the surrounding atmosphere or can be separated from the surrounding atmosphere via the first valve seat. The at least one working chamber can further be connected to the vacuum power source or separated from the vacuum power source via the second valve seat. If the control valve assembly is in the normal position, in which both valve seats are closed, the first valve seat can be opened by actuation of the force input member and by an ensuing displacement of the actuating piston in the actuating direction. The actuating direction can correspond to a force output direction of the brake booster. Opening the first valve seat establishes a fluidical connection between the surrounding atmosphere and the at least one working chamber. Consequently, a higher pressure builds up in the at least one working chamber compared with the at least one vacuum chamber, which pressure acts on the at least one movable wall. The at least one movable wall and the substantially cylindrical control valve housing coupled therewith are displaced as a result of the prevailing pressure difference until an equilibrium state, that is to say the normal position, in the advanced position of the control valve housing is established. In this equilibrium position or normal position, both the valve seats are again closed. If the force input member is released, starting from the equilibrium position/normal position, by reduction of a pedal actuating force, and the actuating piston is thus displaced contrary to the actuating direction under the action of a return spring, the second valve seat between the at least one working chamber and the vacuum power source opens, so that a pressure equalization takes place at the movable wall.

It should be noted here that the normal position, as explained, describes an equilibrium position which is not necessarily and exclusively synonymous with an unactuated state of the brake booster. In a completely unactuated state of the brake booster, it can also be provided, for example, that only the first valve seat is closed, while the second valve seat is open slightly.

In order to achieve the object, the flow restricting sleeve is in the normal position under preload at least sectionally in contact with the actuating piston, wherein the flow restricting sleeve is provided with at least one flow restricting window and wherein the flow restricting sleeve is displaceable by a predetermined functional path from the normal position relative to the control valve housing upon an actuation of the force input member. During this displacement, the flow restricting sleeve is in contact with the actuating piston, so that a fluidical connection between the at least one working chamber and the surrounding atmosphere exists via the at least one flow restricting window. The flow restricting sleeve lifts from the actuating piston when exceeding the functional path.

As a result of the preload of the flow restricting sleeve, the flow restricting sleeve can be displaced substantially synchronously with the actuating piston when the actuating piston is displaced. In other words, the flow restricting sleeve can follow the displacement of the actuating piston by the functional path. If the displacement of the actuating piston relative to the control valve housing exceeds the predetermined functional path, the flow restricting sleeve is not displaced further with the actuating piston, so that the flow restricting sleeve lifts from the actuating piston. The exceeding of the functional path thus concerns the displacement of the actuating piston by actuation of the force input member and the associated displacement of the flow restricting sleeve in the actuating direction.

The functional path can be exceeded in that manner, for example, if a high brake force is rapidly applied to the brake pedal and thus to the force input member. In this case, the lifting of the force restricting sleeve from the actuating piston allows the ambient air to flow substantially unhindered into the at least one working chamber through the gap that forms. It can thereby be ensured that, when a high brake force is applied, for example in the case of emergency braking, the necessary pressure build-up speed can be achieved.

However, as long as the displacement of the actuating piston by actuation of the force input member relative to the control valve housing does not exceed the predetermined functional path of the flow restricting sleeve, the flow restricting sleeve continues to be at least sectionally in contact with the actuating piston. The inflowing ambient air is thus restricted, since it is able to pass into the at least one working chamber only via the at least one flow restricting window.

Accordingly, by means of the described control valve assembly of the present invention, the flow of incoming ambient air into the at least one working chamber is restricted when the control valve assembly is displaced from the normal position. Since the flow restricting sleeve according to the invention that is provided for restricting the flow is displaceable, the use of flow restricting components made of rubber-elastic, deformable materials can substantially be dispensed with. As a result, a wear-resistant and at the same time robust control valve assembly is provided.

According to the invention, contact between the flow restricting sleeve and the actuating piston can be provided in particular between a face of the actuating piston facing the flow restricting sleeve and an end face of the flow restricting sleeve. The face portion of the actuating piston and the end face of the flow restricting sleeve that are in contact can each be planar. Alternatively, one of the two faces can also have an annular sealing bead or the like.

According to a further development of the invention, the flow restricting sleeve can be displaceable from the normal position, upon an actuation of the force input member relative to a valve element, by the predetermined functional path. The valve element can thereby be in positioning contact with the control valve housing at least in the actuating direction in the normal position. The flow restricting sleeve can thus be displaced from the normal position relative to the valve element and thus at the same time relative to the control valve housing upon actuation of the force input member.

The flow restricting sleeve can further have at least one stop flange which can be brought at least sectionally into contact with a stop face of the valve element or another component of the control valve assembly. The stop flange can be in one piece with the flow restricting sleeve. Alternatively, the stop flange can also be connected to the flow restricting sleeve in the form of an additional component, for example in an interlocking manner.

According to a further development of the invention, the stop flange of the flow restricting sleeve can be spaced apart from the stop face of the valve element or the other component of the control valve assembly by the functional path in the normal position. As a result, the functional path can be limited in the actuating direction, that is to say in the direction of displacement of the flow restricting sleeve upon actuation of the force input member, by cooperation of the stop flange with the stop face. More precisely, the movement of the flow restricting sleeve, which on account of the preload takes place in the actuating direction of the displacement of the actuating piston by the force input member, can be limited by the cooperation of the stop flange with the stop face. When the functional path is exceeded as described above upon displacement of the actuating piston, this can lead to lifting of the flow restricting sleeve from the actuating piston as soon as the stop flange comes into contact with the stop face.

According to a further embodiment of the invention, an end face of the valve element can form a sealing contact face of the first valve seat and of the second valve seat in the normal position. The end face can thereby be formed opposed to the stop face of the valve element. The end face of the valve element can at least sectionally, that is to say in the region of the first and/or second valve seat, be in the form of a planar face or in the form of a sealing bead.

According to a further development of the invention, the at least one flow restricting window can be arranged in a region of the flow restricting sleeve adjacent to the actuating piston. Alternatively, the flow restricting window can also be arranged radially in the flow restricting sleeve at a distance from the end face of the flow restricting sleeve. An annularly closed flow restricting sleeve portion, which does not have a flow restricting window, can thereby be formed between the end face of the flow restricting sleeve which can be brought into contact with the actuating piston and the at least one flow restricting window. A plurality of flow restricting windows can further be provided along the circumference of the flow restricting sleeve, wherein the flow restricting windows can each be spaced apart from one another. A plurality of flow restricting windows can also be arranged spaced apart from one another in the longitudinal direction of the flow restricting sleeve. When arranging and providing the at least one flow restricting window and/or the plurality of flow restricting windows, it is to be ensured in each case that they are so arranged that, when the flow restricting sleeve is in contact with the actuating piston, a fluidical connection between the surrounding atmosphere and the at least one working chamber can be established via the flow restricting window/windows when the first valve seat is opened.

According to a further development of the invention, the flow restricting sleeve can have a substantially cylindrical shape with a first diameter and a second diameter, wherein the second diameter is larger than the first diameter. The above-described stop flange can thereby be formed by a connecting face which connects the flow restricting sleeve portion having the first diameter to the flow restricting sleeve portion having the second diameter. The flow restricting sleeve portion having the first diameter can thereby form a portion of the flow restricting sleeve that faces the actuating piston. The at least one flow restricting window can be provided according to the invention in the flow restricting sleeve portion having the first diameter. Furthermore, the length of the flow restricting sleeve portion having the first diameter, which extends from the end face which can be brought into contact with the actuating piston to the stop flange, or the connecting face, can be chosen in dependence on the further components of the control valve assembly, in particular the actuating piston and the valve elements. The functional path can thus be predetermined by the choice of the length and further form of the flow restricting sleeve.

According to a further embodiment of the invention, the control valve assembly can comprise a holding ring which supports a return spring acting on the flow restricting sleeve. The holding ring can further be preloaded by a further return spring. The return spring acting on the flow restricting sleeve can be supported on the inside of the stop flange of the flow restricting sleeve, that is to say on the inside of the connecting face of the flow restricting sleeve between the flow restricting sleeve portion having the first diameter and the flow restricting sleeve portion having the second diameter.

The further return spring acting on the holding ring can engage with a first end on a side of the holding ring remote from the flow restricting sleeve and with a second end on a support means connected to the force input member. Accordingly, by actuation of the brake pedal, that is to say by displacement of the force input member in the actuating direction, the preload on the holding ring can be increased via the further return spring. The further return spring can thereby be stiffer than the return spring acting on the flow restricting sleeve. The holding ring can thus be held in position as a support base for the return spring acting on the flow restricting sleeve. Furthermore, the further return spring, by cooperating with the support means of the force input member, can act on the force input member in such a manner that the force input member is displaced back contrary to the actuating direction when the brake pedal force is reduced. The further return spring can additionally serve to bias the control valve assembly into the normal position in an unactuated rest position.

The holding ring, starting from the normal position, can be fixed in the actuating direction. The holding ring can thereby assume a substantially fixed position upon actuation of the control valve assembly from the normal position against the flow restricting sleeve return spring. The flow restricting sleeve return spring can thus be supported in such a manner that it preloads the flow restricting sleeve for displacement by the functional path synchronously to the movement of the actuating piston. In other words, it is possible to ensure, by means of the return spring acting on the flow restricting sleeve, that the flow restricting sleeve is in contact with the actuating piston during the displacement of the actuating piston. This is the case as long as the stop flange is not in contact with the stop face of the valve element, that is to say as long as the functional path is not exceeded.

According to a further development of the invention, the first valve seat can be in the form of an annular inner seal seat on the actuating piston and/or the second valve seat can be in the form of an annular outer seal seat on the control valve housing. By means of such an arrangement, the first valve seat can be opened upon displacement of the actuating piston in the force output direction without opening the second valve seat. Furthermore, in this arrangement the second valve seat can be opened upon displacement contrary to the actuating direction, while the first valve seat is closed.

At least one connecting channel to the at least one working chamber can further be provided between the first valve seat and the second valve seat. Ambient air from the surrounding atmosphere is able to flow into the at least one working chamber via this connecting channel when the first valve seat is opened, so that in known manner a pressure difference can be built up at the at least one movable wall.

In a further embodiment of the invention, the control valve assembly can comprise a holding element which is at least sectionally in contact with the control valve housing and at the same time centers the flow restricting sleeve relative to a longitudinal axis. The holding element can have a circular outer circumference and a circular inner circumference. The holding element can further rest at least with a portion of the outer circumferential surface on the inner circumferential surface of the control valve housing in a sealing manner. The holding element can further have a face portion on the inner circumferential surface which is in sealing contact with a portion of the outer circumferential surface of the flow restricting sleeve. The holding element can constitute a connection between the flow restricting sleeve and the control valve housing and thus center the flow restricting sleeve relative to the longitudinal axis.

By means of sealing contact between the holding element and the control valve housing and also between the holding element and the flow restricting sleeve it can be ensured that ambient air is able to flow from the surrounding atmosphere into the at least one working chamber only on the inside of the flow restricting sleeve. According to the invention, sealing contact between the holding element and the flow restricting sleeve can be in such a form that the flow restricting sleeve is freely displaceable relative to the control valve housing and the holding element.

The holding element can further be at least sectionally in contact with the holding ring and/or the above-described further return spring on a side remote from the actuating piston. A preload applied by the further return spring can thus be transmitted to the holding element indirectly via the holding ring and/or directly.

According to a further embodiment of the invention, the holding element can fix a portion of the valve element and/or can support a valve element return spring which preloads the valve element in the direction of the valve seats. The valve element return spring can thereby be received at least sectionally in a recess provided in the holding element. The holding element can further be in contact with the portion of the valve element via two faces. The valve element can thus be fixed by the holding element in two directions, whereby the holding element can, for example, fix the valve element in the actuating direction and center it relative to the longitudinal axis. The portion of the valve element can thereby be arranged between the holding element and the control valve housing. The valve element, when it is in contact at least with the second valve seat, can thus be fixed completely in its position by the second valve seat, the two faces of the holding element that are in contact and the inner circumferential surface of the control valve housing. Furthermore, a portion of the valve element that cooperates with the valve element return spring can be spaced apart radially and/or axially, relative to a longitudinal axis, from the portion of the valve element that is in contact with the holding element in such a manner that an optimum force distribution acts on the valve element, wherein the valve element is pushed in the direction of the first and second valve seat. The holding element can further form the stop face for the flow restricting sleeve.

According to a further embodiment of the invention, the vacuum brake booster can comprise a first and a second working chamber, a first and a second vacuum chamber and a first and a second movable wall. The first and the second working chambers can be connected to one another via at least one connecting channel. Such a form of the vacuum brake booster is frequently referred to as a tandem vacuum brake booster.

The vacuum brake booster can in principle be used for conventional brake systems but also for brake systems which can be used for regenerative braking, for example in hybrid vehicles. The latter are distinguished in that, in an initial phase of braking, the vacuum brake booster initially remains passive and the vehicle is slowed down substantially by the generator action of an electric motor. The action of the brake booster only begins after a time delay. In such an embodiment, the second valve seat is initially open at the start of braking, that is to say in the normal position of the brake booster, so that the at least one working chamber is connected to the at least one vacuum chamber and no pressure build-up can take place at the movable wall. The second valve seat closes only with a time delay upon braking, whereupon the action of the vacuum brake booster begins. An alternative embodiment of the invention provides that, in the normal position of the control valve assembly, both the first valve seat and the second valve seat are closed. This embodiment can be used in conventional vehicles which do not provide a regenerative braking function. In this variant, the brake booster responds immediately when the brake pedal is actuated, because the working chamber and the vacuum chamber are already separated from one another by the closed second valve seat at the start of braking and a pressure difference can thus be built up at the movable wall between the working chamber and the vacuum chamber immediately in response to an actuation of the brake pedal.

It will be appreciated that the subject-matter of the invention is not limited to the embodiments described above. The described embodiments and features can be combined as desired by the person skilled in the art without departing from the subject-matter of the invention.

Other advantages of this invention will become apparent to those skilled in the art from the following detailed description of the preferred embodiments, when read in light of the accompanying drawings.

DETAILED DESCRIPTION OF THE INVENTION

Figure 1:
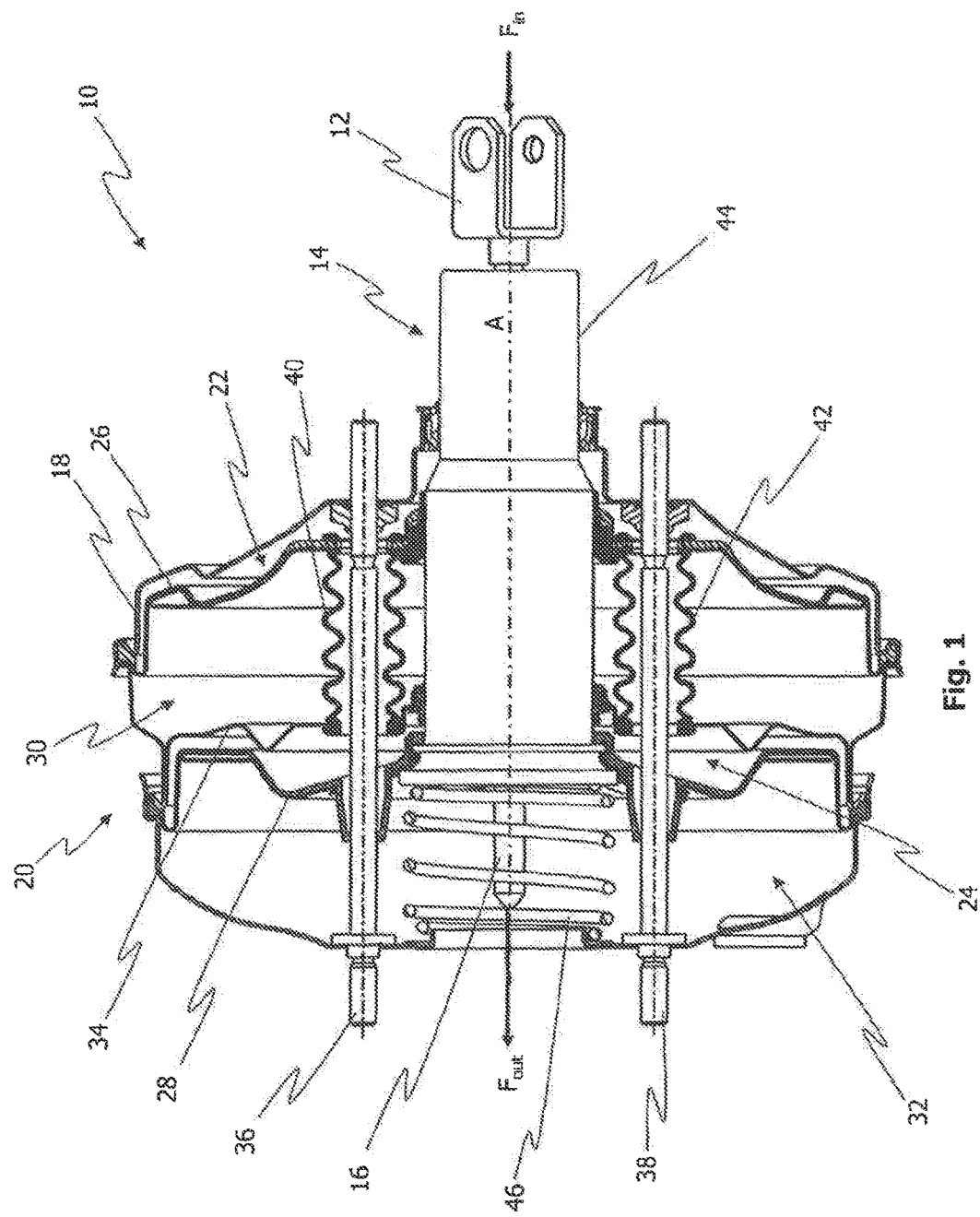
FIG. 1 shows a partial sectional representation containing an axis of a vacuum brake booster according to the invention.

In FIG. 1, a vacuum brake booster according to the invention of a first embodiment is shown in a sectional view containing an axis and is designated generally 10. The vacuum brake booster 10 comprises a force input member 12 which can be coupled, for example, with a brake pedal (not shown). The force input member 12 extends with its left-hand end in FIG. 1, which cannot be coupled with the brake pedal, into a control valve assembly 14, which will be described in detail with reference to FIG. 2. The control valve assembly 14 is connected to a force output member 16, which can be coupled with a main brake cylinder (not shown). The vacuum brake booster 10 further comprises a booster housing 18 which is sealed with respect to the surrounding atmosphere and in which the control valve assembly 14 is received at least sectionally and is displaceable therein along a longitudinal axis A.

Via the force input member 12, an actuating force can be introduced via the brake pedal (not shown) into the brake booster 10 in a force input direction $F_{in}$. The actuating force introduced is boosted by the brake booster 10 and transmitted further in a force output direction $F_{out}$ to the main brake cylinder located downstream. In the embodiment shown, the force output direction $F_{out}$ corresponds to the actuating direction described hereinbefore.

A chamber arrangement 20 is provided in the booster housing 18. In the embodiment of the invention shown, it is a tandem chamber arrangement, the form of an alternative chamber arrangement also being possible within the meaning of the invention. The tandem chamber arrangement shown comprises a first working chamber 22 and a second working chamber 24, each of which is separated from a vacuum chamber 30, 32 by a movable wall 26, 28. The chamber arrangement 20 shown thus comprises a first pair consisting of the working chamber 22 and the vacuum chamber 30 and a second pair consisting of the working chamber 24 and the vacuum chamber 32. The two chamber pairs are separated from one another by a fixed wall 34 arranged in the housing 18. In the representation shown, two fixing bolts 36, 38 pass through the booster housing 18 and the chamber arrangement 20 provided therein, by means of which bolts the vacuum brake booster 10 can be connected to a vehicle chassis. The fixing bolts 36 and 38 each pass through a connecting channel 40, 42, the connecting channels in turn in each case fluidically connecting the first working chamber 22 to the second working chamber 24.

The movable walls 26, 28 are each fixedly connected to the control valve assembly 14, more precisely to a housing of the control valve assembly 44, for joint movement. The control valve housing 44 is substantially cylindrical in shape. During operation of the vehicle, the vacuum chambers 30 and 32 are permanently connected to a vacuum power source (not shown), for example the intake manifold of the vehicle. The working chambers 22 and 24 can be connected either to the vacuum power source or to the surrounding atmosphere in dependence on the actuation of the control valve assembly 14. As a result, a differential pressure between the working chamber 22, 24 and the associated vacuum chamber 30, 32 can be built up at the movable walls 26, 28, in order to boost a brake force applied via the brake pedal and the force input member 12.

Figure 2:
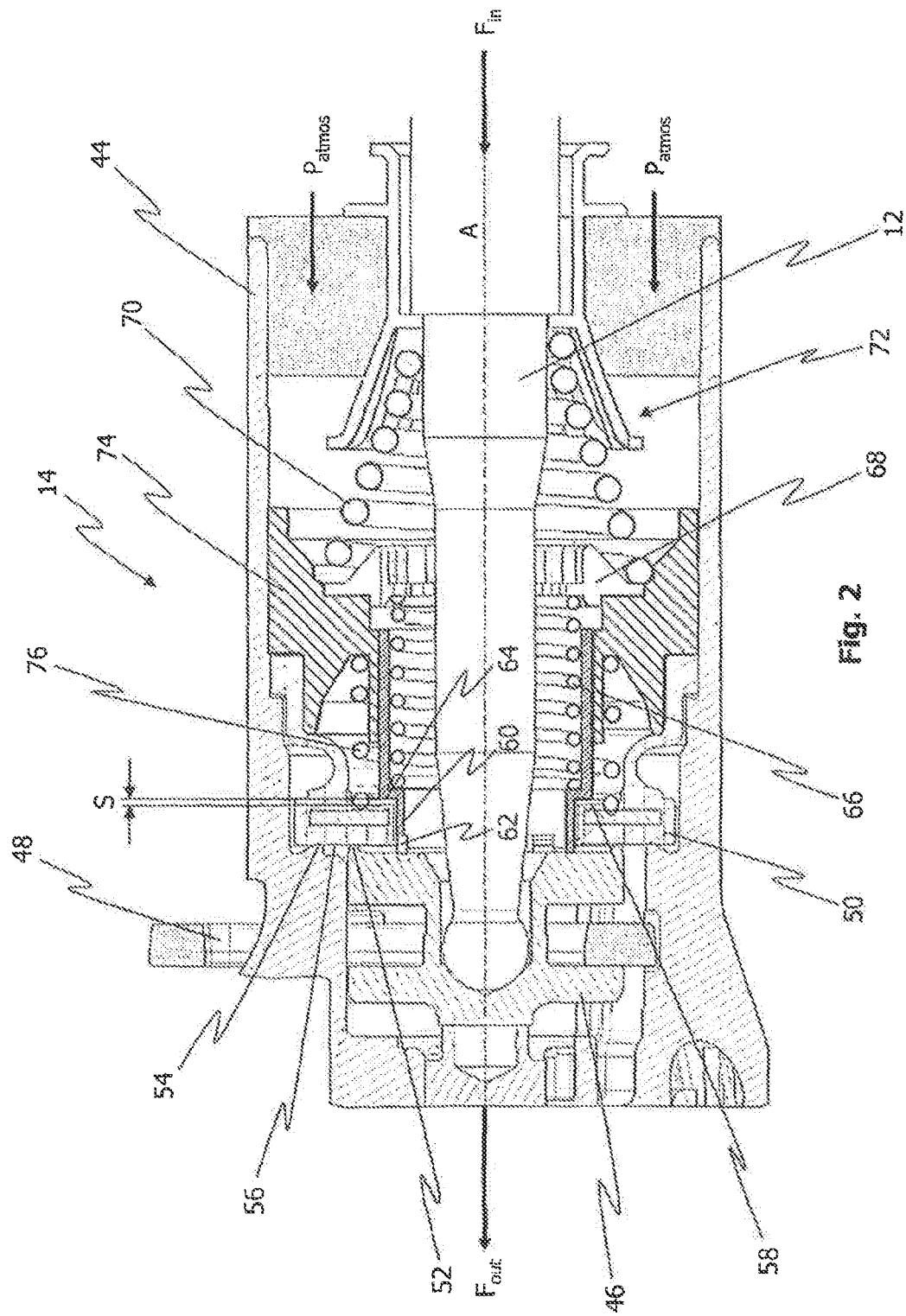
FIG. 2 shows a detailed sectional representation of the control valve assembly of the vacuum brake booster according to the invention.

The control valve assembly 14 is biased into the normal position shown in FIG. 2 via a housing return spring 46. In the embodiment shown, the normal position at the same time corresponds to the unactuated rest position of the brake booster. The housing return spring 46 rests at one end against the control valve housing 44 and at the other end on a support base of the booster housing 18. It should be noted here that the housing return spring 46 can also bias the control valve assembly 14 into a position other than that shown in FIG. 2. For example, an unactuated rest position of the control valve assembly 14 can differ in an alternative embodiment from the normal position shown in FIG. 2 without departing from the invention. However, the normal position shown in FIG. 2 serves as the reference position hereinbelow.

For the sake of completeness it should be pointed out that the control valve housing 44 is connected in a sealing manner to each of the movable walls 26, 28 and is guided in a sealing manner relative to the booster housing 18 and the fixed wall 34.

FIG. 2 shows a detailed representation of a control valve assembly 14 according to an embodiment of the invention. It is shown that the force input member 12 projects into the control valve housing 44 along the longitudinal axis A. A spherical end of the force input member is received in a corresponding recess in an actuating piston 46. The actuating piston 46 is displaceably received in a portion of the control valve housing 44 which has a smaller diameter than the remainder of the control valve housing 44.

The actuating piston 46 further comprises an annular recess into which a stop element 48 engages at least sectionally, in order to limit the displacement of the actuating piston 46, and thus also of the force input member 12, relative to the control valve housing 44. The actuating piston 46 has in the force output direction $F_{out}$ a cylindrical prolongation for transmitting force to the force output member 16. On the face of the actuating piston 46 remote therefrom, that is to say the surface of the actuating piston 46 remote from the force output direction $F_{out}$, an annular sealing bead is provided. Together with a valve element 50 in contact therewith, the annular sealing bead forms a first valve seat 52. By opening and closing this first valve seat 52, the working chambers 22, 24 can be connected to the surrounding atmosphere. The control valve housing 44 is open to the surrounding atmosphere on the right-hand side in FIG. 2, which is indicated by the arrows $P_{atmos}$. In order to connect the surrounding atmosphere to the working chambers 22, 24 by opening the first valve seat 52, a corresponding connecting channel is provided radially outside the first valve seat relative to the longitudinal axis A.

A second valve seat 54 is provided radially outside the first valve seat 52, relative to the longitudinal axis A, between the control valve housing 44 and the valve element 50. More precisely, an annular sealing bead is provided on a portion of the control valve housing 44, which annular sealing bead cooperates with the valve element 50. The annular sealing bead is arranged on a portion of the control valve housing 44 which extends substantially perpendicularly relative to the longitudinal axis A and connects a control valve housing portion of larger diameter to a control valve housing portion of smaller diameter, the actuating piston 46 being received in the portion of smaller diameter. In the normal position shown in FIG. 2, the annular sealing bead of the actuating piston 46 and the annular sealing bead of the control valve housing 44 are in contact with an end side 56 of the valve element 50. Accordingly, in the normal position of the control valve assembly 14 that is shown, the first working chamber 22 and the second working chamber 24 are separated from the associated vacuum chambers 30, 32 and from the surrounding atmosphere. Both the first valve seat 52 and the second valve seat 54 are closed in the normal position. The end face 56 of the valve element is provided opposed to a stop face 58 of the valve element 50.

The control valve assembly 14 further comprises a flow restricting sleeve 60, through which the force input member 12 is guided. In the normal position, the flow restricting sleeve 60 is in sealing contact by an end face facing in the force output direction Four with the actuating piston 46, with the exception of a flow restricting window 62 provided in the flow restricting sleeve 60. The flow restricting window is provided in a region of the flow restricting sleeve 60 adjacent to the actuating piston 46. The flow restricting sleeve 60 has a substantially cylindrical shape, the flow restricting sleeve 60 comprising a flow restricting sleeve portion having a first diameter and a flow restricting sleeve portion having a second diameter, the second diameter being larger than the first diameter. The flow restricting sleeve portion having the first diameter forms the portion of the flow restricting sleeve 60 that is adjacent to the actuating piston 46 in the normal position, while the flow restricting sleeve portion having the second diameter extends towards the side shown on the right in FIG. 2 and is spaced apart axially from the actuating piston 46 by the flow restricting sleeve portion having the first diameter. The flow restricting sleeve portion having the first diameter is connected to the flow restricting sleeve portion having the second diameter via a connecting face 64 and extends substantially perpendicularly to the two flow restricting sleeve portions.

The connecting face 64 of the flow restricting sleeve 60 at the same time forms a stop flange 64 which can be brought into contact with the stop face 58 of the valve element 50 and is spaced apart therefrom by a functional path S in the normal position shown. On the inside of the flow restricting sleeve 60, the stop flange 64 serves as a support base for a return spring 66. The return spring 66 is received at least sectionally in the flow restricting sleeve 60 and is supported at one end on the inner support base of the flow restricting sleeve 60 formed by the stop flange 64 and cooperates at the end remote from the stop flange with a holding ring 68. A preload is thus exerted via the return spring 66 on the flow restricting sleeve 60 in the direction of the actuating piston 46, or in the force output direction $F_{out}$.

The holding ring 68 is in turn preloaded relative to the longitudinal axis A by a further return spring 70. The further return spring 70 cooperates with the holding ring 68 on a side remote from the flow restricting sleeve 60, the further return spring 70 being supported at an end remote from the holding ring 68 on a support means 72 of the force input member 12.

Both the flow restricting sleeve 60 and the holding ring 68 are centered radially relative to the longitudinal axis A by a holding element 74. For this purpose, the holding element 74 has a face portion which is in sealing contact with the outer circumferential surface of the flow restricting sleeve 60, more precisely the outer circumferential surface of the flow restricting sleeve portion having the second diameter. The flow restricting sleeve 60 is axially displaceable relative to the holding element 74 and thus also relative to the control valve housing 44. A further stop face provided on the holding element 74 is, as already mentioned, at least sectionally in contact with the holding ring 68, whereby the holding ring is centered radially relative to the longitudinal axis A. A face portion of the outer circumferential surface of the holding element 74 rests against the inner circumferential surface of the control valve housing 44, so that radial centering of the holding element 74 and thus, as described, of the flow restricting sleeve 60 and of the holding ring 68 is ensured. The holding element 74 is also in contact in the axial direction, relative to the longitudinal axis A, with the holding ring 68, so that the holding element 74 is preloaded axially by the further return spring 70 indirectly via the holding ring 68.

The holding element 74 further comprises a recess in which a valve element return spring 76 is received at least sectionally. This valve element return spring 76 is supported at its end remote from the holding element 74 on the valve element 50 and thus preloads it in the direction of the valve seats 52, 54. The valve element 50 is additionally in contact by means of a bellows-like prolongation with two faces of the holding element 74 and with a portion of the inner circumference of the control valve housing 44. In the embodiment shown, a portion of the valve element 50 is received between a portion of the holding element 74 and a portion of the inner circumferential surface of the control valve housing 44 and is thereby centered radially relative to the longitudinal axis A. By the further contact with the sealing bead of the control valve housing 44 and an axial face portion of the holding element 74, the valve element 50 is fixed both axially and radially in the normal position shown.

As already described hereinbefore, the stop flange 64 of the flow restricting sleeve 60 is spaced apart from the stop face 58 of the valve element 50 by a distance S in the normal position shown in FIG. 2, the distance S determining the functional path S of the flow restricting sleeve. If, starting from the normal position, the force input member 12 is displaced in the force output direction $F_{out}$ by actuation of the brake pedal, the actuating piston 46 is thus also displaced in the force output direction $F_{out}$, so that the valve seat 52 opens. The valve element 50, the holding element 74 and the holding ring 68, which are axially in contact with one another and rest directly or indirectly on the sealing bead of the control valve housing 44 in the normal position, are not displaced by the actuation of the force input member 12. The flow restricting sleeve 60, on the other hand, is preloaded in the force output direction $F_{out}$ by the return spring 66 and is initially fixed axially in the force output direction $F_{out}$ by the contact of the end face of the flow restricting sleeve 60 with the actuating piston 46. If, as described hereinbefore, the actuating piston 46 then moves in the force output direction $F_{out}$, the flow restricting sleeve 60 synchronously follows the axial displacement of the actuating piston 46 owing to the preload. This means that the end face of the flow restricting sleeve 60 initially continues to be in contact with the actuating piston 46 in the case of displacement of the actuating piston in the force output direction $F_{out}$. Accordingly, when the first valve seat 52 opens, a fluidical connection between the working chambers 22, 24 with the surrounding atmosphere is initially established only via the flow restricting window 62. Since the flow restricting sleeve 60 is in sealing contact with the actuating piston 46 via the end face except for the flow restricting window 62, the ambient air flows into the working chambers 22, 24 only via the flow restricting window 62.

However, the possible displacement of the flow restricting sleeve 60 is limited to the functional path S by the stop flange 64 and the stop face 58 of the valve element. The displacement of the flow restricting sleeve 60 can accordingly follow the displacement of the actuating piston 46 only by the functional path S. If the displacement of the actuating piston 46 exceeds the functional path S, the stop flange 64 of the flow restricting sleeve 60 comes into contact with the stop face 58 of the valve element 50, so that a further axial displacement of the flow restricting sleeve 60 in the force output direction $F_{out}$ is blocked. The actuating piston 46, on the other hand, is displaced further in the force output direction $F_{out}$ if the functional path S is exceeded, which leads to the flow restricting sleeve 60 being lifted from the actuating piston 46. As a result, an annular gap is opened between the flow restricting sleeve 60 and the actuating piston 46, through which ambient air likewise flows into the working chambers 22, 24. In this state, the ambient air is thus able to flow substantially without restriction into the working chambers 22, 24.

If, by cooperation with the return springs of the brake booster, there is a pressure equalization at the movable walls 26, 28, the normal position shown in FIG. 2, in which the first valve seat 52 and the second valve seat 54 are closed and the flow restricting sleeve 60 is in contact with the actuating piston 46, is re-established. Likewise, the second valve seat 54 is opened by reduction of the brake pedal force in known manner, whereby the first valve seat 52 is closed, so that the working chambers 22, 24 are connected to the vacuum power source until there is a pressure equalization at the movable walls 26, 28 and the normal position is re-established.

Figure 3:
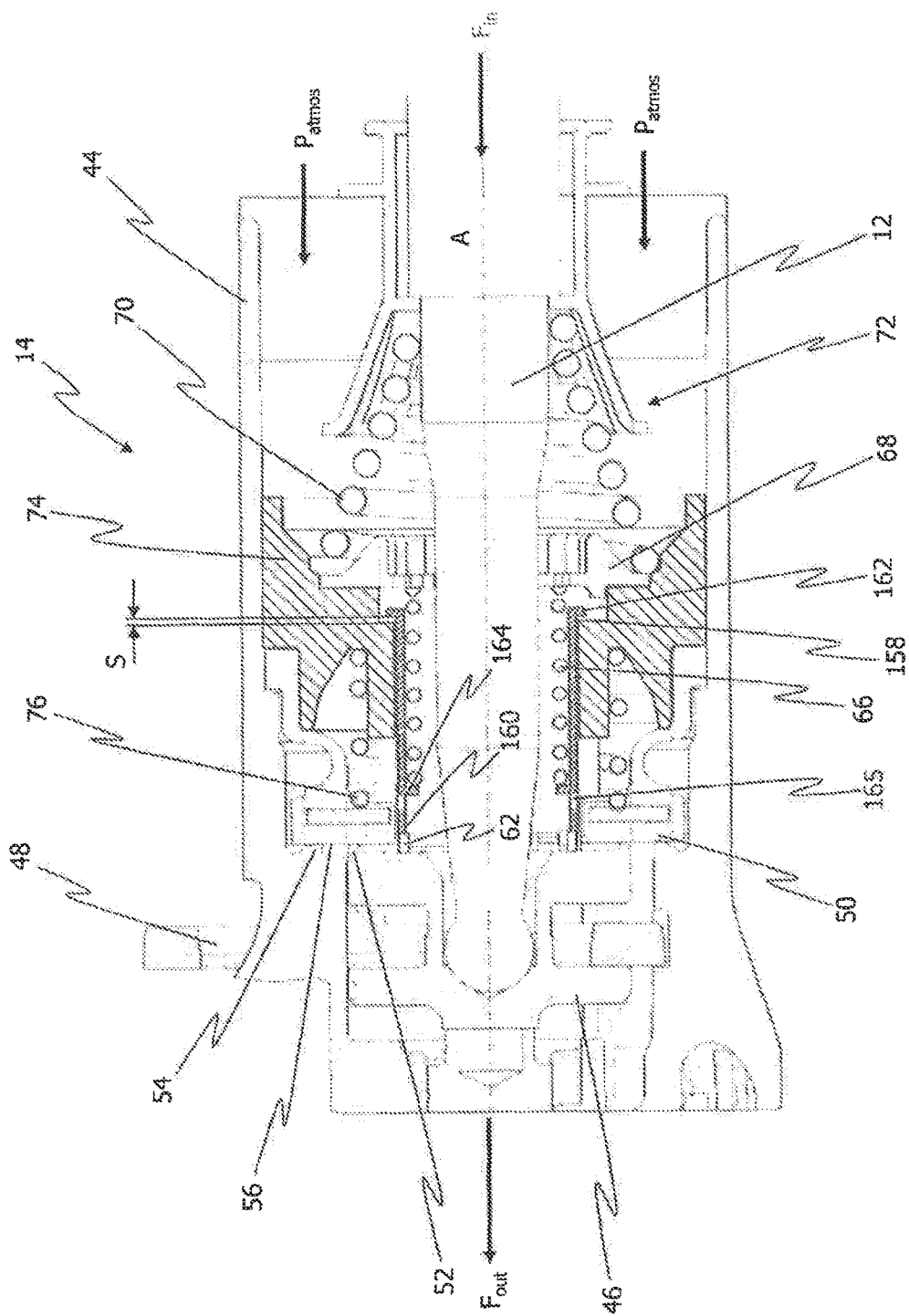
FIG. 3 shows a detailed sectional representation according to FIG. 2 of a second embodiment of the control valve assembly of the vacuum brake booster according to the invention.

FIG. 3 shows a view corresponding to FIG. 2 of a second embodiment of the control valve assembly according to the invention. The same reference numerals as in the preceding description are used for components which have the same effect or are the same. In order to avoid repetition, only the differences between the embodiments will be discussed.

In this second embodiment, the flow restricting sleeve 160 has a different form to the flow restricting sleeve 60 according to the first embodiment. The flow restricting sleeve 160 has at its right-hand end in FIG. 3 a flange 162 which in the normal position shown in FIG. 3 is arranged at a distance corresponding to the functional path S from a stop shoulder 158 of the holding element 74. Moreover, the flow restricting sleeve 160 is substantially circular-cylindrical in shape, wherein it has close to its left-hand end in FIG. 3 a plurality of tabs 164 which are bent radially inwards. These tabs 164 are obtained by making approximately U-shaped incisions in the body of the flow restricting housing 160 and then bending the cut-out portions radially inwards. Radial openings 165 are also obtained thereby. The tabs 164 protruding radially inwards serve as axial support for the return spring 66 and thus have the same function as the radially inner region of the stop flange 64.

The method of functioning is substantially the same as explained with reference to FIGS. 1 and 2. The functional path S present in the normal position and the return spring 66 act in such a manner that, at the beginning of a brake actuation, the flow restricting sleeve 160 remains in contact with the actuating piston 46 via its left-hand end face in FIG. 3 and follows the movement of the actuating piston until the flange 162 comes into contact with the stop shoulder 158. During this joint movement of the actuating piston 46 and the flow restricting sleeve 160, an air flow from the surrounding atmosphere into the working chamber 22 can take place only through the flow restricting window 62 with the first valve seat 52 open. As a result, the advantages mentioned at the beginning are achieved at the start of braking, in particular the avoidance of instabilities and vibrations because of too rapid an air flow. As soon as the degree of brake actuation exceeds the functional path S, the actuating piston 46 lifts from the end face of the flow restricting sleeve 160 and air is able to flow both through the flow restricting window 62 and past the end face.

When the brake pedal is released, the above-described functional phases take place in the reverse order.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A vacuum brake booster for a motor vehicle brake system, comprising:
   a displaceable force input member which is coupled or is capable of being coupled with a brake pedal,
   a chamber arrangement being arranged in a booster housing, having at least one working chamber and at least one vacuum chamber, which are separated from one another via at least one movable wall,
   a control valve assembly being actuatable by the force input member, and
   a force output member for transferring an actuating force to a downstream brake system,
   wherein the at least one working chamber is optionally fluidically connectable to a vacuum power source or the atmosphere via the control valve assembly, and wherein the control valve assembly is connected to the at least one movable wall for joint movement, wherein the control valve assembly comprises:
   a control valve housing in which an actuating piston is arranged displaceably, the actuating piston being coupled to the force input member, and
   a first valve seat and a second valve seat,
   wherein the control valve assembly is biased into a normal position in which at least the first valve seat is closed,
   wherein
   a flow restricting sleeve which in the normal position under preload is at least sectionally in contact with the actuating piston, wherein the flow restricting sleeve is provided with at least one flow restricting window, and wherein the flow restricting sleeve is displaceable by a predetermined functional path from the normal position relative to the control valve housing upon an actuation of the force input member, wherein the flow restricting sleeve is in contact with the actuating piston during this displacement, so that a fluidical connection between the at least one working chamber and the surrounding atmosphere exists via the at least one flow restricting window, and wherein the flow restricting sleeve lifts from the actuating piston when exceeding the predetermined functional path.

2. The vacuum brake booster according to claim 1,
   wherein the flow restricting sleeve is displaceable by the predetermined functional path from the normal position relative to a valve element upon an actuation of the force input member.

3. The vacuum brake booster according to claim 2,
   wherein the flow restricting sleeve has at least one stop flange which is configured to be brought at least sectionally into contact with a stop face of the valve element or another component of the control valve assembly.

4. The vacuum brake booster according to claim 3,
   wherein the stop flange of the flow restricting sleeve is spaced apart from the stop face of the valve element or of the other component of the control valve assembly by the predetermined functional path in the normal position, so that the predetermined functional path is limited in the actuating direction by cooperation of the stop flange with the stop face.

5. The vacuum brake booster according claim 3,
   wherein an end face of the valve element forms a sealing contact face of the first valve seat and of the second valve seat in the normal position, wherein the end face is preferably provided opposed to the stop face of the valve element.

6. The vacuum brake booster according to claim 3,
   wherein the control valve assembly comprises a holding element which is at least sectionally in contact with the control valve housing and centers the flow restricting sleeve relative to a longitudinal axis.

7. The vacuum brake booster according to claim 6,
   wherein the holding element fixes a portion of the valve element and/or supports a valve element return spring which preloads the valve element in the direction of the two valve seats and/or has the stop face.

8. The vacuum brake booster according to claim 1,
   wherein the at least one flow restricting window is arranged in a region of the flow restricting sleeve adjacent to the actuating piston.

9. The vacuum brake booster according to claim 1, wherein the flow restricting sleeve has a substantially cylindrical shape with a first diameter and a second diameter, wherein the second diameter is larger than the first diameter.

10. The vacuum brake booster according to claim 1, wherein the control valve assembly comprises a holding ring which supports a return spring acting on the flow restricting sleeve.

11. The vacuum brake booster according to claim 10, wherein the holding ring is preloaded by a further return spring.

12. The vacuum brake booster according to claim 1, wherein the first valve seat is in the form of an annular inner seal seat on the actuating piston and/or the second valve seat is in the form of an annular outer seal seat on the control valve housing.

13. The vacuum brake booster according to claim 1, wherein at least one connecting channel to the at least one working chamber is provided between the first valve seat and the second valve seat.

14. The vacuum brake booster according to claim 1, wherein the vacuum brake booster comprises a first and a second working chamber, a first and a second vacuum chamber and a first and a second movable wall, wherein the first and the second working chambers are connected to one another via at least one connecting channel.

15. The vacuum brake booster according to claim 1, wherein, in the normal position of the control valve assembly, both the first valve seat and the second valve seat are closed.

* * * * *